United States Patent
Chen

(10) Patent No.: US 7,909,254 B2
(45) Date of Patent: Mar. 22, 2011

(54) DOCUMENT WITH INDEXES AND ASSOCIATED DOCUMENT READER SYSTEM

(75) Inventor: Li-Ming Chen, Keelung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 484 days.

(21) Appl. No.: 12/078,503

(22) Filed: Apr. 1, 2008

(65) Prior Publication Data

US 2008/0185437 A1  Aug. 7, 2008

Related U.S. Application Data

(62) Division of application No. 10/919,322, filed on Aug. 17, 2004, now Pat. No. 7,350,718.

(30) Foreign Application Priority Data

Jul. 12, 2004 (TW) ................................ 93120758 A

(51) Int. Cl.
*G06K 7/10* (2006.01)

(52) U.S. Cl. .................................................. 235/454
(58) Field of Classification Search ................... 235/454
See application file for complete search history.

(56) References Cited

U.S. PATENT DOCUMENTS 6,330,976 B1 * 12/2001 Dymetman et al. .......... 235/487
* cited by examiner

*Primary Examiner* — Jamara A Franklin
(74) *Attorney, Agent, or Firm* — Bacon & Thomas, PLLC

(57) ABSTRACT

A document with indexes and associated document reader system. The document is constructed by printing plural pixels and divided into plural areas. Each of the areas has plural indexes respectively consisting of a group of indexing dots to represent an area code corresponding to the area. The indexes and the pixels have different optical reflection features. The system includes a filter, a pattern sensor and a pattern decoder. The filter allows a light with special wavelengths to pass through, so as to obtain a desired light corresponding to the indexes of the document. The sensor is connected to the filter for sensing the light passed through and accordingly forming a pattern to output. The decoder is connected to the sensor for decoding and thus obtaining corresponding indexes in accordance with the pattern outputted by the sensor.

24 Claims, 10 Drawing Sheets

DOCUMENT WITH INDEXES AND ASSOCIATED DOCUMENT READER SYSTEM

This application is a division of nonprovisional application Ser. No. 10/919,322, filed Aug. 17, 2004.

BACKGROUND OF THE INVENTION

1. Field of the Invention

The invention relates to the technical field of data recognition, and, more particularly, to a document with isotropic indexes and associated document reader system.

2. Description of Related Art

To increase convenience, interest and availability to read a document printed on an object such as paper or the like, a typical process embeds indexes in pictures printed on a document, uses an external reader to read an index corresponding to a part of pictures, and activates an output device to generate, such as a sound output, in accordance with the index read by the reader, thereby effectively helping reading by the sound. However, due to the embedded index in pictures on the document, it causes complicated document production and affects picture presentation. Further, how indexes are read accurately without picture affection is a problem to be solved.

U.S. Pat. No. 5,416,312 granted to Lamoure, et al. for an "Document bearing an image or a text and provided with an indexing frame, and associated document analysis system" superimposes a layer of indexes with plural dots on a source image. As shown in FIG. 1, an index 10 consists of five active rows and five blank rows. The active rows contain the encoding locations 30 and the empty encoding locations 31. Such an index 10 can represent different picture objects, which can be read by an optical reader system for post processing. For example, indexes representing different picture objects are associated with speeches so that a speech corresponding to a picture object is played as the optical reader system reads the picture object.

However, in U.S. Pat. No. 5,416,312, the index 10 arranges plural print dots in a matrix and orthogonal form. However, such an arrangement may cause incorrect reading on twisted pictures. Namely, when the document with the index 10 is slightly twisted, the optical reader system cannot read the index 10 accurately. In addition, an X-Y coordinate has to be applied to the optical reader system for accurately determining an orientation of the read index 10 and identifying the index orientation along with multiple codes. Further, the prior art superimposes the index 10 on the printed pictures, which limits the printing procedures and wastes time.

SUMMARY OF THE INVENTION

An object of the invention is to provide a document with indexes and associated document reader system, which can accurately read the indexes in a twisted document.

Another object of the invention is to provide a document with indexes and associated document reader system, which can concurrently print the indexes and associated document pictures.

In accordance with one aspect of the present invention, there is provided a document with indexes. The document is constructed by printing plural pixels and divided into plural areas, each area having plural indexes to represent an area code corresponding to the area. The indexes, which are printed on the document with the pixels in mixture, are readable by a special optical reader system for extraction.

In accordance with another aspect of the present invention, there is provided a document with indexes. The document is constructed by printing plural pixels and divided into plural areas, each area having plural indexes to represent an area code corresponding to the area. The indexes are readable by a special optical reader system, wherein each of the indexes has a center dot, plural direction dots and plural first data dots. The center dot is on a center of the index. The plural direction dots are distributed respectively on a first distance from the center dot. One of the direction dots is used as a direction recognition dot to indicate a start of indexing with respect to the center dot. The plural first data dots are distributed respectively on a second distance from the center dot, wherein the second distance is greater than the first distance.

In accordance with a further feature of the present invention, there is provided an optical reader system capable of reading a document with indexes. The document is constructed by printing plural pixels and divided into plural areas, each area having plural indexes to represent an area code corresponding to the area. The indexes and the pixels have different optical reflection features. The system comprises a filter, a sensor and a decoder. The filter allows a light with special wavelengths to pass through, so as to obtain a desired light corresponding to the indexes of the document. The sensor is connected to the filter for sensing the light passed through and accordingly forming a pattern to output. The decoder is connected to the sensor for decoding and thus obtaining corresponding indexes in accordance with the pattern outputted by the sensor.

In accordance with a further feature of the present invention, there is provided a method of printing a document with indexes. The document is constructed by printing plural pixels and divided into plural areas, each area having plural indexes to represent an area code corresponding to the area. The indexes and the pixels have different optical reflection features. The method includes a color space transfer step, a mixture step and a print step. The color space transfer step performs an RGB to YMCK conversion on an RGB image and generate YMCK image. The mixture step mixes the indexes respectively with YMCK pixels to thus generate mixed pixels. The print step prints both the YMCK pixels and the mixed pixels to thus form the pixels of the document.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
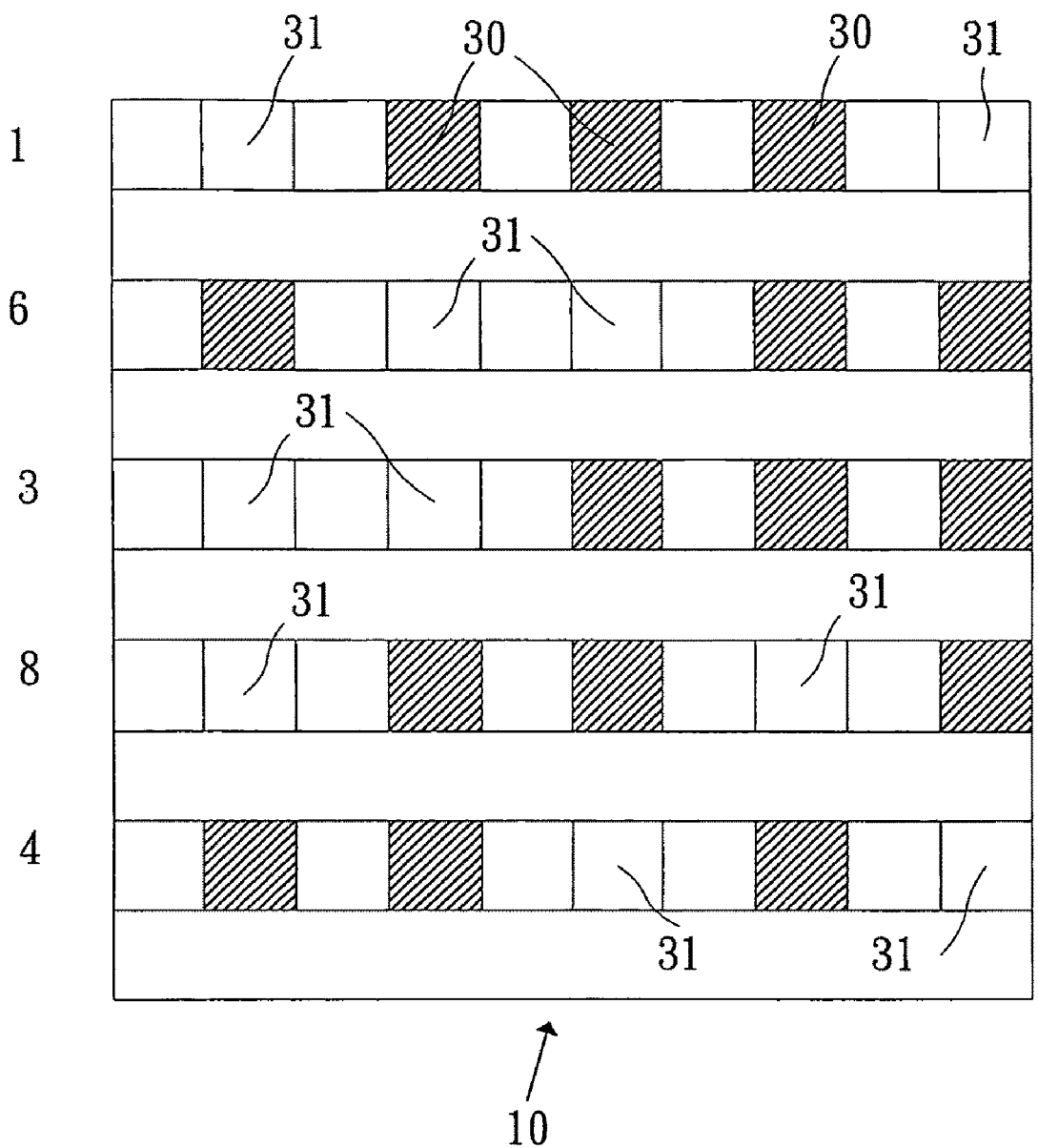
FIG. 1 schematically shows a typical index.
Figure 2:
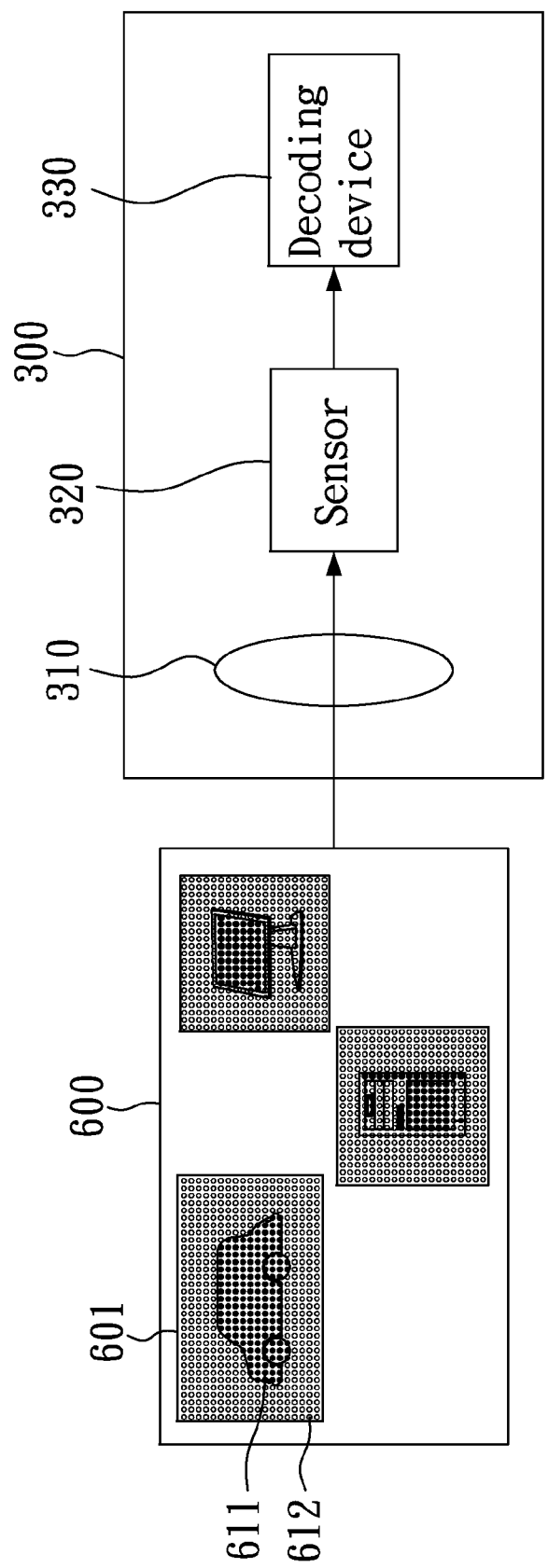
FIG. 2 is a block diagram of an optical reader system capable of reading a document in accordance with the invention.

FIG. 2 is a block diagram of an optical reader system 300 capable of reading a document 600 in accordance with the invention. As shown, the document 600 consists of plural pixels 611 that can form different objects, such as a car, a computer or a monitor. According to the objects, the document 600 can be divided into plural areas, each area 601 having at least one object and plural indexes 612 to represent a code corresponding to the area 601. The indexes 612 and the pixels have different optical reflection features.

The optical reader system 300 includes a filter 310, a sensor 320 and a decoder 330. The filter 310 allows a desired light with a special wavelength to pass through, wherein the desired light corresponds to the indexes 612 of the document. The sensor 320 is connected to the filter 310 for sensing the light and accordingly forming a pattern to output. The decoder 330 is connected to the sensor 320 for decoding and thus obtaining a picture information of corresponding indexes 612 in accordance with the pattern 320 outputted by the sensor 320.

In this embodiment, the indexes 612 are printed in materials, such as carbonaceous inks, readable by the optical reader system 300. When a special light (such as an infrared) irradiates, the carbonaceous ink on the indexes 612 can absorb the infrared such that the sensor 320 senses a dark dot to the index 612. The pixels 611 are generally printed in materials, such as any ink without carbon, unreadable by the optical reader system 300. When a special light (such as an infrared) irradiates, the infrared passes through the ink on the pixels 611 to reach a print paper and thus produce a reflective light so that the sensor 320 senses a light dot. Due to the different materials used, the indexes and the pixels have different reflection features. The filter 310 allows the light with wavelengths greater than 800 nm to pass through, thereby obtaining reflective light from pixels, other than the indexes.

Figure 3:
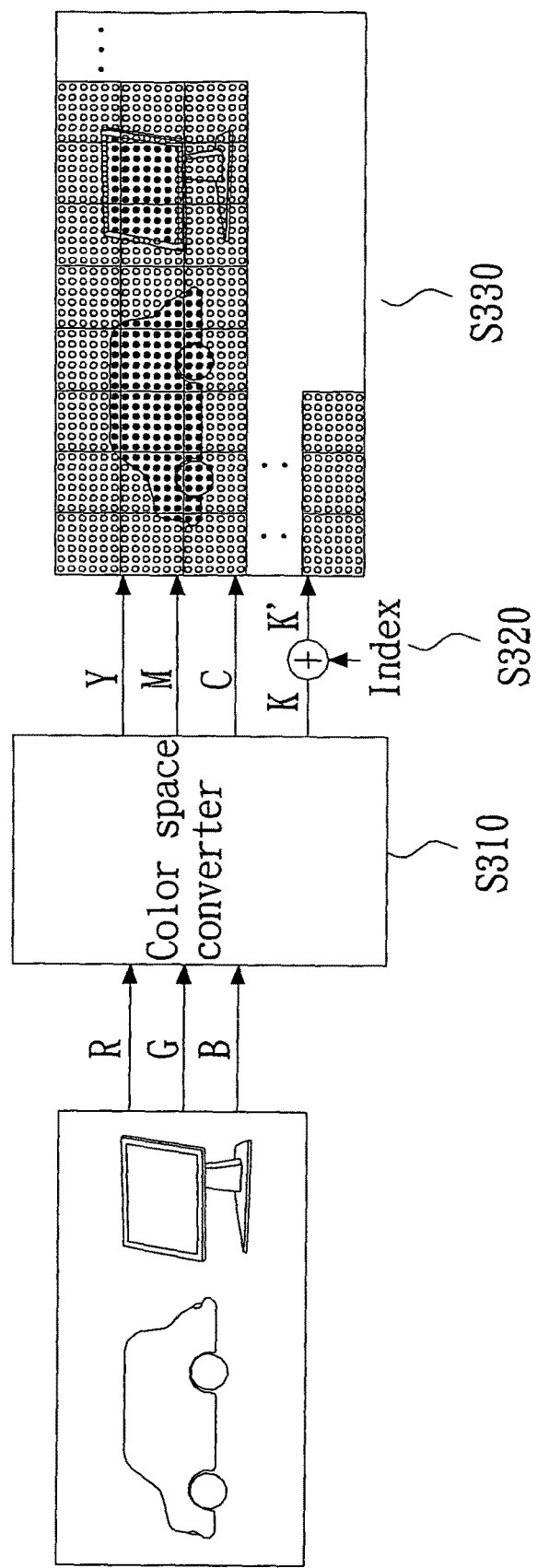
FIG. 3 is a flowchart of printing a document in accordance with the invention.

FIG. 3 is a flowchart of printing a document with indexes in accordance with the invention. As shown, a picture printed in the document can be in a BMP, JPG or TIFF format. The printing performs a color space conversion (step S310), so as to convert the picture format from an RGB form into a YMCK form. Thus, each pixel of the picture can be converted into YMCK pixels 611 of a 1-bit halftone image, i.e., each pixel converted is constructed by a black (K) pixel, a yellow (Y) pixel, a magenta (M) pixel and a cyan (C) pixel, which is well known in the print technique and thus a detailed description is deemed unnecessary.

In step S320, the indexes and the YMCK pixels 611 are mixed. Generally, the black (K) pixels 611 are printed by a carbonaceous ink and also the indexes are printed in a material readable by the optical reader system. Accordingly, with mixture of the indexes and the black (K) pixels, a printer can print the black pixels and indexes by one-pass print.

In step S330, it prints both the K pixels mixed with the indexes and the YMC pixels (i.e., the Y, M and C pixels). To avoid overlapping the indexes and the K pixels, each of the K pixels can be decomposed into YMC pixels of 1-bit halftone image to print. Namely, each 1-bit K halftone image is split into and represented by corresponding YMC pixels 611, without substantially printing the K pixel. In addition, the overlapped indexing dots and K pixels 611 can be printed as usual but cannot be read accurately. However, indexes are distributed over associated areas and accordingly the entire performance is not affected since some of indexes in the associated areas can be read accurately.

Figure 4:
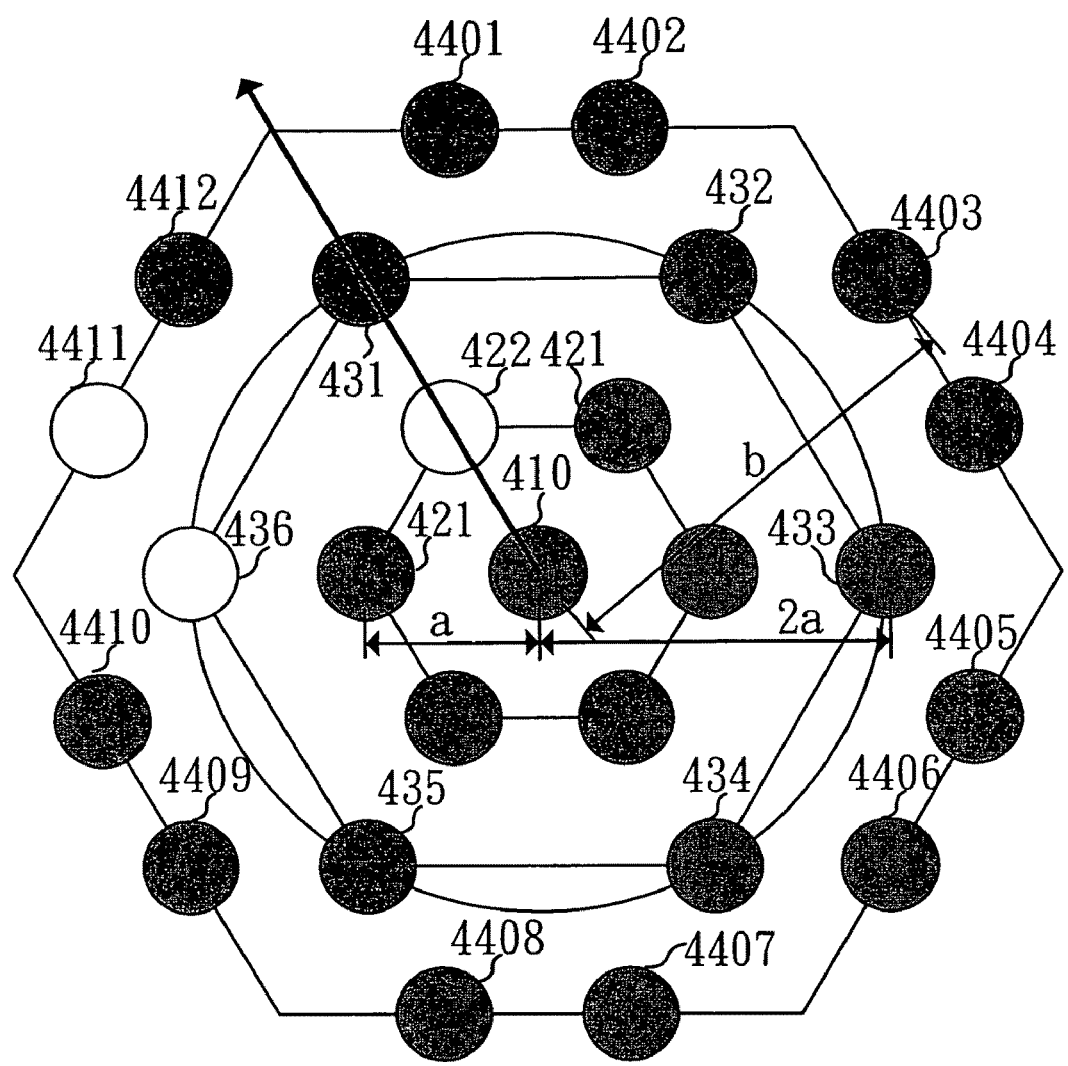
FIG. 4 schematically shows an index in accordance with the invention.

FIG. 4 schematically shows an index 612 in accordance with the invention. As shown, each index consists of a plurality of indexing dots. The indexing dots are arranged in isotropic, each indexing dot having a radius of about 100 µm. The dots include a center dot 410, plural direction dots 421 and 422, plural first data dots 431-436 and plural second data dots 4401-4412. In this embodiment, each index 612 has six direction dots 421 and 422 respectively located on a first distance 'a' from the center dot 410, thereby providing a direction indication, wherein the first distance 'a' is about 400 µm. The direction indication is provided with the direction dot 422 as a direction recognition dot to indicate indexing direction with respect to the center dot 410. The direction recognition dot 422 can be a blank or hollow dot, which represents no dot printed.

As shown, each index 612 has six first data dots 431-436 respectively located on a second distance '2a' from the center dot 410, thereby providing a first data indication, wherein the second distance '2a' is greater than the first distance 'a'. In this case, the second distance '2a' is twice the first distance 'a'. The first data dots 431-436 can be blank dots to represent logic 0 or solid dots to represent logic 1 respectively. The first data indication is arranged in a clockwise or counterclockwise direction starting with one of the six first data dots that locate on the same line with the direction recognition dot 422 and the center dot 410. Namely, as starting with the dot 431 in FIG. 4, the first data indication indicates a value of $111110_b$ while the dot 431 represents the most significant bit (MSB) in the clockwise direction and a value of $011111_b$ while the dot 431 represents the least significant bit (LSB) in the counterclockwise direction.

Figure 5:
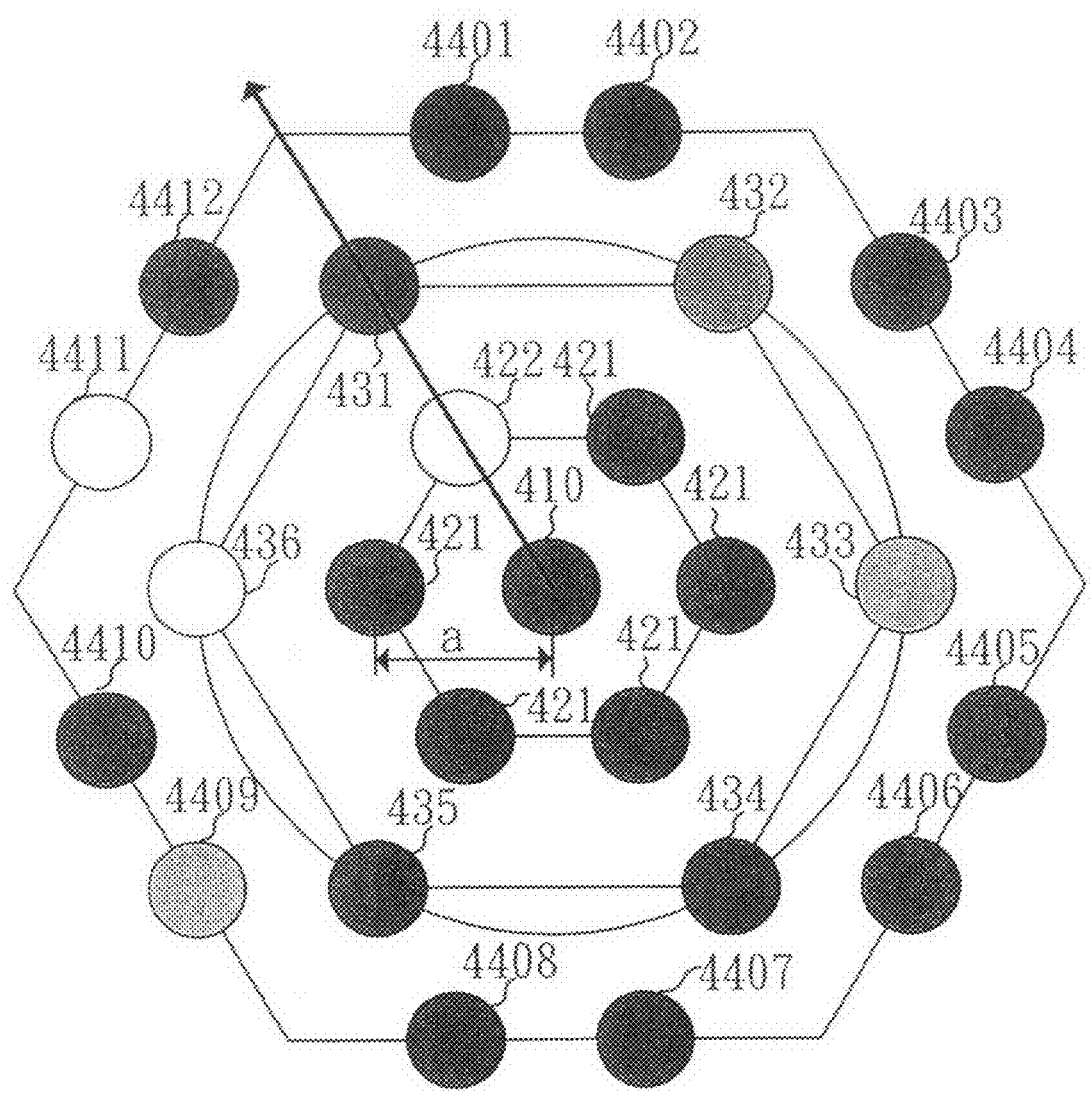
FIG. 5 schematically shows another index in accordance with the invention.

As shown in FIG. 5, the six first data dots 431-436 in FIG. 4 can be dots with different gray levels, wherein a dot with first gray scale value indicates a value of $11_b$ (such as the dot 431 in FIG. 5, its gray level values from 0 to 32), a dot with second gray scale value indicates a value of $10_b$ (such as the dot 432 in FIG. 5, its gray level values from 49 to 80), a dot with third gray scale value indicates a value of $01_b$ (such as the dot 433 in FIG. 5, its gray level values from 112 to 144), and a dot with fourth gray scale value indicates a value of $00_b$ (such as the dot 436 in FIG. 5, its gray level values from 180 to 212). When the first data dot 431 indicates the most significant bit (MSB), the first data indication in FIG. 5 represents a value of $111001111100_b$. The dots are shown by the first to fourth gray scale values respectively to indicate $11_b$, $10_b$, $01_b$, $00_b$, but they can be shown by first to fourth colors respectively to $11_b$, $10_b$, $01_b$, $00_b$.

Referring back to FIG. 4, each index 612 has twelve second data dots 4401-4412 respectively located on a third distance 'b' from the center dot 410, thereby providing a second data indication, wherein the third distance is greater than the second distance. The second data dots 4401-4412 can be blank dots to indicate logic 0 or solid dots to indicate logic 1 respectively. The second data indication is arranged starting with one of the six first data dots that is the first one in a clockwise direction from a line including the direction recognition dot 422 and the center dot 410. Namely, the dot 4401 in FIG. 4 is a start to represent the most significant bit (MSB), and accordingly the second data indication indicates a value of $111111111101_b$. Similarly, the second data dots 4401-4412 in FIG. 5 can provide with more data amount due to the different gray levels or colors.

Figure 6:
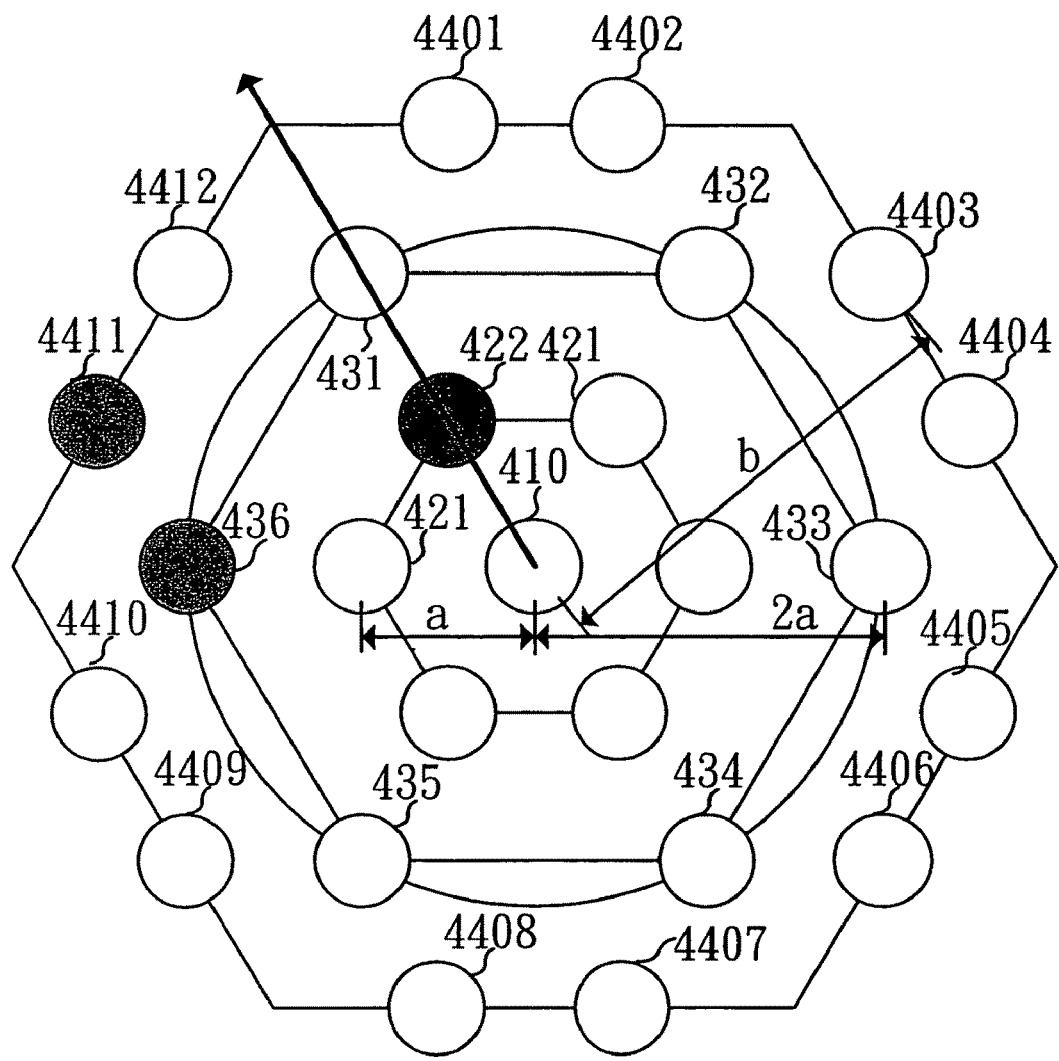
FIG. 6 schematically shows a complementary index in accordance with the invention.

Since the indexes are printed in materials readable by the optical reader system, for more uniformity and pleasing in print viewing, materials unreadable by the optical reader system are added in printing as complementary indexes, as shown in FIG. 6. The complementary indexes are complementary to the indexes of FIG. 4. Briefly, a blank or hollow index of FIG. 4 becomes a solid index of FIG. 6, and a solid index of FIG. 4 becomes a blank or hollow index. The complementary indexes in FIG. 6 have identical print positions to that of the indexes in FIG. 4, i.e., the complementary indexes are overlapped with the indexes.

Figure 7:
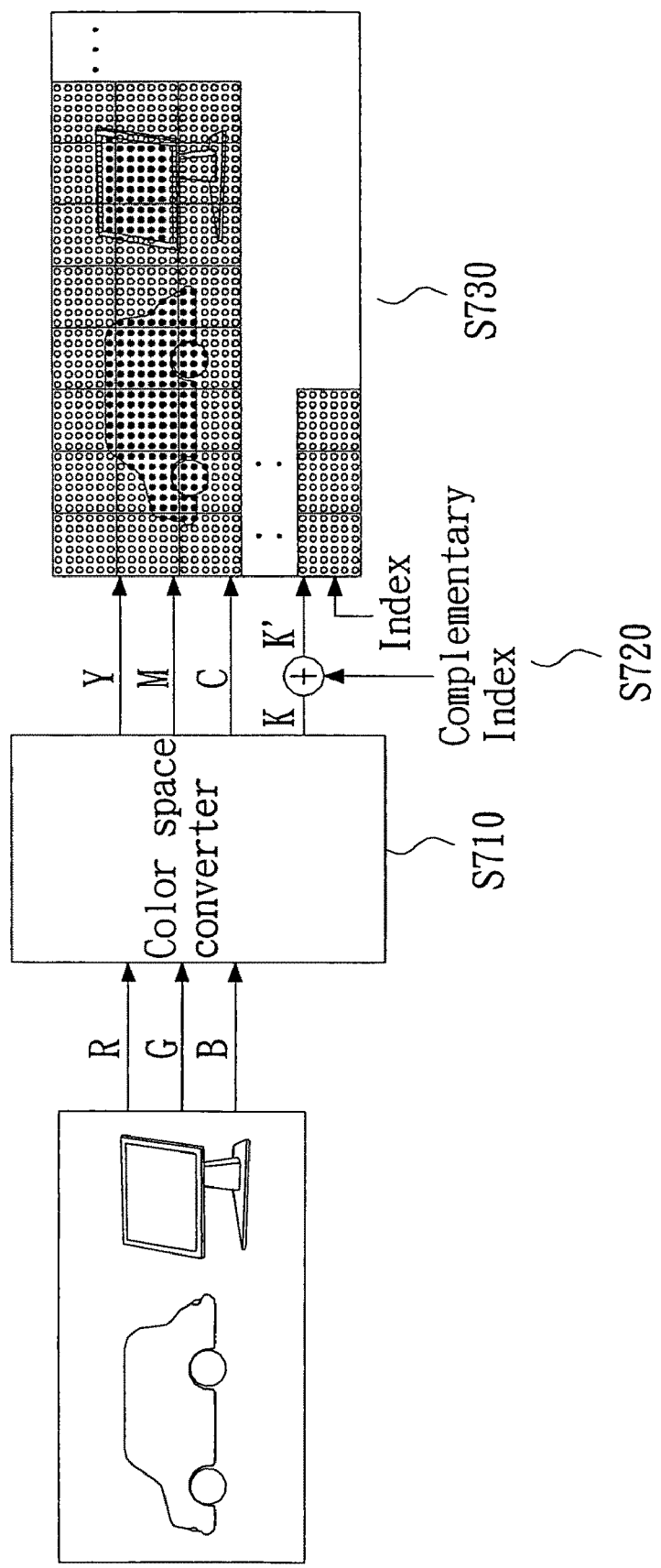
FIG. 7 is another flowchart of printing a document in accordance with the invention.

In the description of step S320, both the indexes and the K pixels 611 use materials readable by the optical reader system. As shown in FIG. 7, another embodiment shows that the indexes are printed in a material readable by the optical reader system, but all YMCK pixels 611 and complementary indexes are printed in a material readable by the optical reader system. In addition, the complementary indexes are mixed with the K pixels, as shown in step S720. As such, the indexes can be read accurately even they are overlapped with the K pixels or the complementary indexes.

Figure 8:
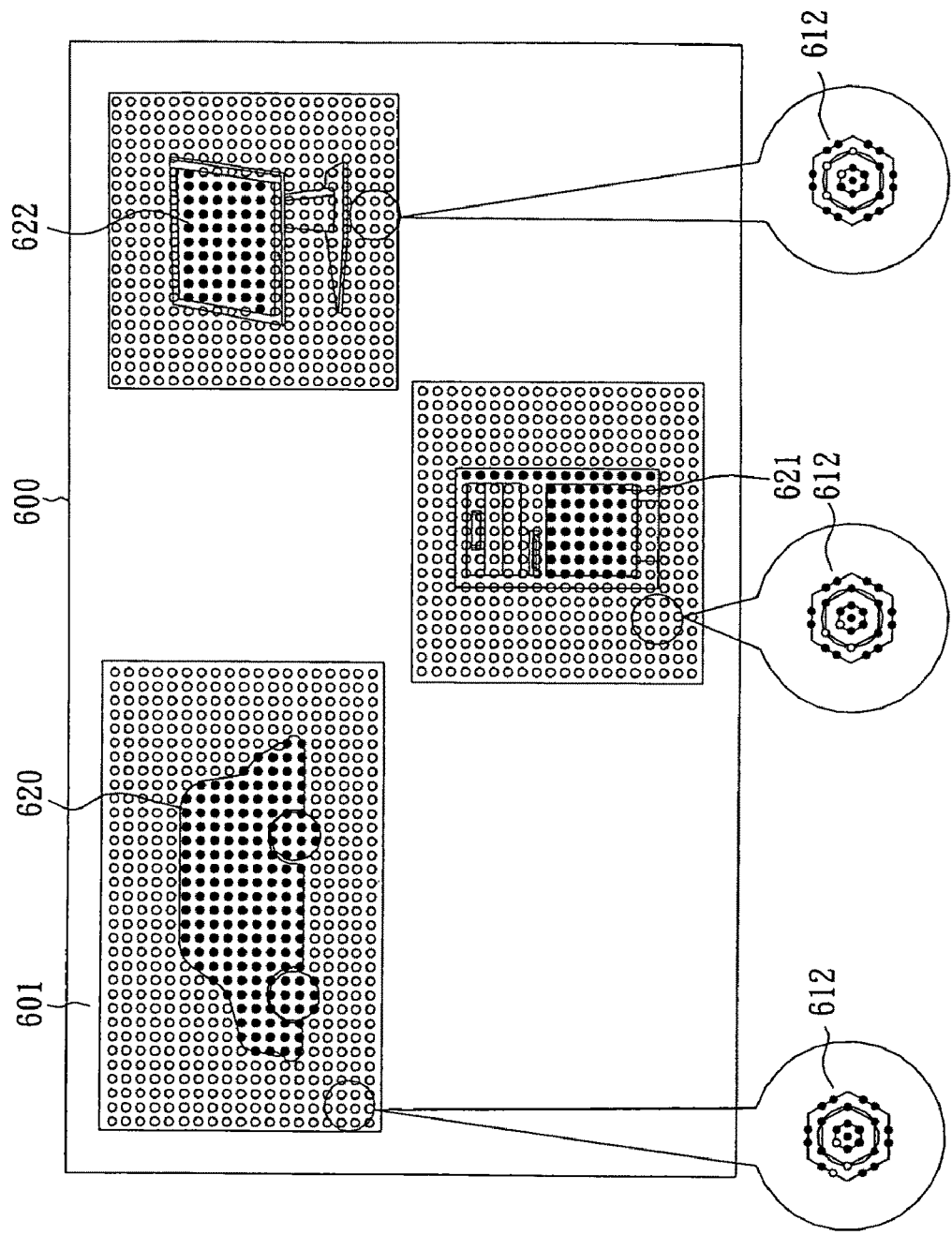
FIG. 8 schematically shows an application of indexes in accordance with the invention.

FIG. 8 schematically shows an index application in accordance with the invention. As shown, the document 600 consists of three picture objects 620-622 located in respective areas 601, each area having plural indexes 612 to indicate a serial number in a database for a respective object 620, 621 or 622 in the area. For example, the indexes 612 indicates a serial number of 111110-111111111101$_b$ for the object 620, a serial number of 011110-111111111111$_b$ for the object 621, and a serial number of 001110-111111111111$_b$ for the object 622.

The indexes 612 and the objects 620-622 apply materials with different optical reflection features for printing. For example, the indexes 612 applies a carbonaceous ink for printing while the objects 620-622 apply an ink without carbon content for printing, or the indexes 612 applies green ink for printing while the objects 620-622 apply blue or red ink for printing. As cited, the indexes 612 and the objects 620-622 can have different optical reflection features. Therefore, the inventive optical reader system 300 can read the indexes 612 successfully.

Figure 9:
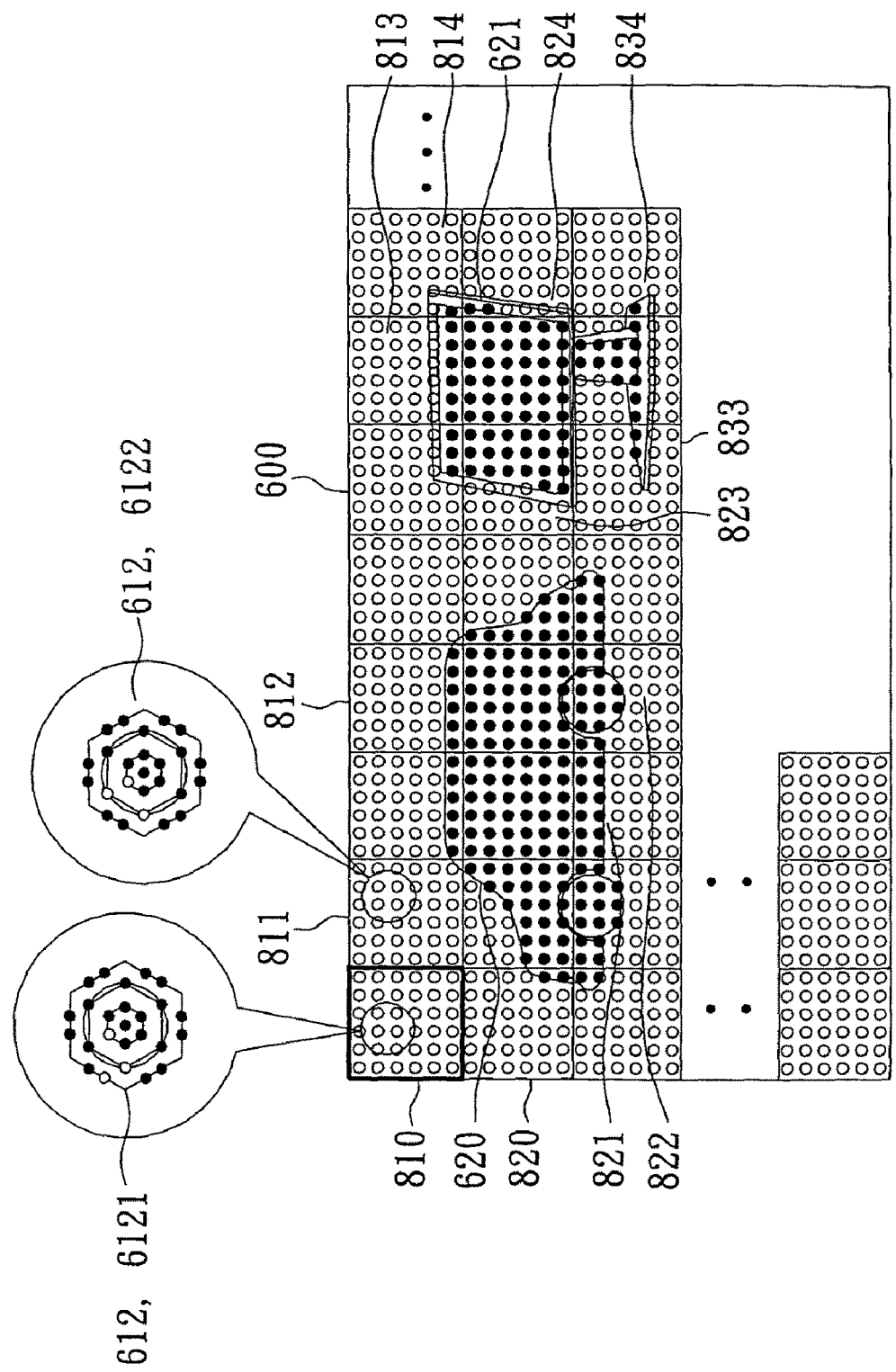
FIG. 9 schematically shows another application of indexes in accordance with the invention.

FIG. 9 schematically shows another index application in accordance with the invention. In FIG. 9, the document 600 is equally divided into plural areas 810, 811, ..., 834, ..., etc. Each of the areas has plural indexes to have a respective index value, such as an index 6121 for area 810 and an index 6122 for area 811. The document 600 has two picture objects 620 and 621. The object 620 is on areas 810-812, 820-822 while the object 621 is on areas 813, 814, 823, 824, 833, 834. The optical reader system 300 can pre-store a lookup table for indexing areas 810-812, 820-822 to the object 620 and areas 813, 814, 823, 824, 833, 834 to the object 621.

The orientation of the aforementioned index 612 may be unaligned in printing or presents different in placing the document 600 leaning by a user. However, due to the inventive direction indication, the index 612 can be read accurately by the optical reader system 300 in any orientation, without finding an X-Y direction as required in the prior art for accurately determination on the index read.

Figure 10:
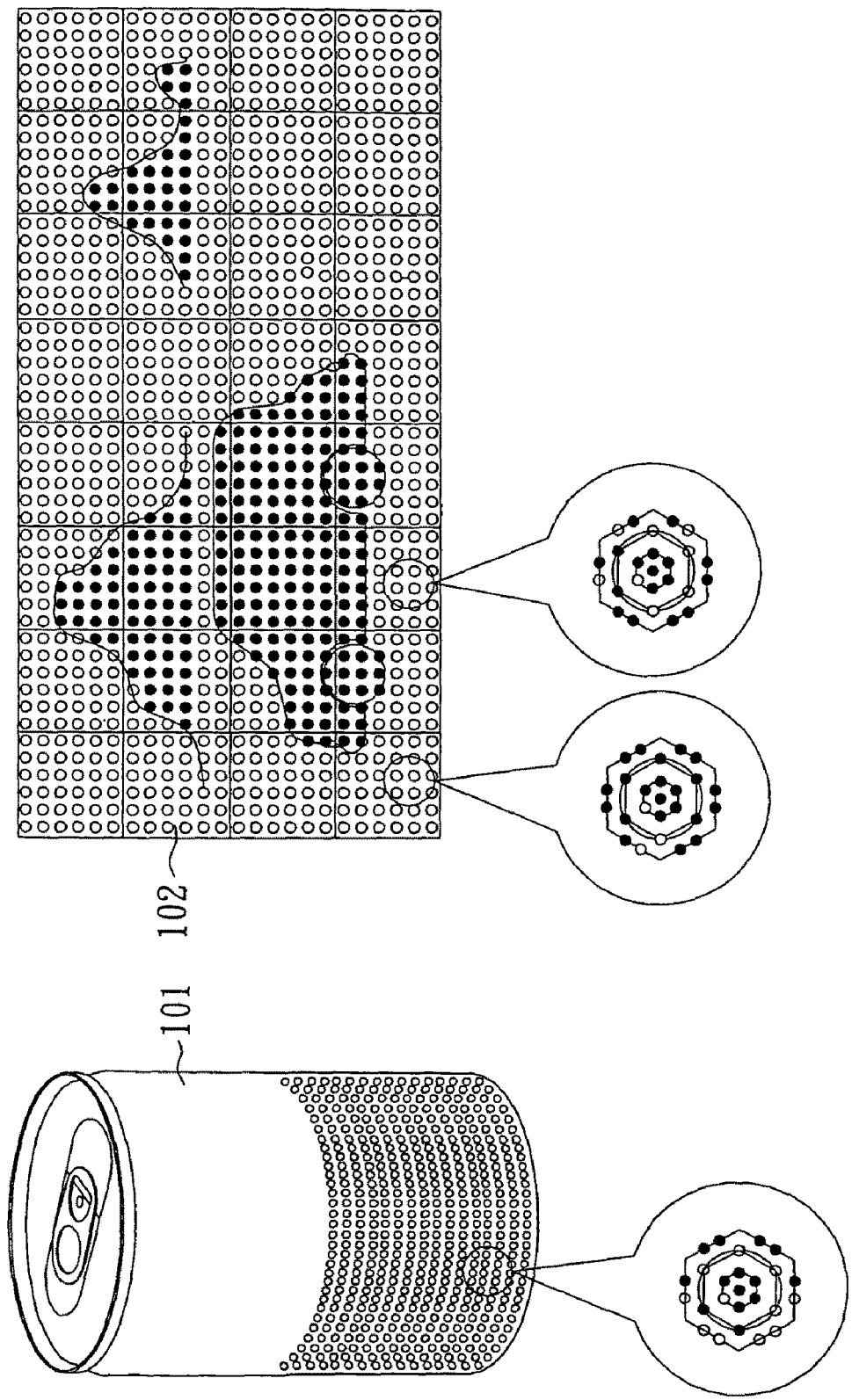
FIG. 10 schematically shows two extensions in accordance with the invention.

As shown in FIG. 10, the document with indexes can be printed on an object, such as a can 101 and a jigsaw 102. The indexes with different indexing dots are printed on a surface of the can 101 and the jigsaw 102, and even the subdivisions of mountain and car pictures in the jigsaw 102 can be distinct in accordance with the inventive different indexes or indexing dots.

Although the present invention has been explained in relation to its preferred embodiment, it is to be understood that many other possible modifications and variations can be made without departing from the spirit and scope of the invention as hereinafter claimed.

What is claimed is:

1. An optical reader system for reading a document with indexes, the document being constructed by printing plural pixels and divided into plural areas, each area having plural indexes to represent an area code corresponding to an area, the indexes and the pixels having different optical reflection features, both the indexes and the plural pixels being printed on the document, each of the indexes having plural indexing dots in an isotropic arrangement, the indexing dots having a center dot for positioning the indexes, the indexes using a material readable by the optical reader system in printing, the system comprising:

a filter, which allows a light with specific wavelengths to pass through, so as to obtain a desired light corresponding to the indexes of the document;

a sensor, which is connected to the filter for sensing the light passed through the filter and, accordingly, forming a pattern to output; and a decoder, which is connected to the sensor for decoding and thus obtaining corresponding indexes in accordance with the pattern outputted by the sensor;

wherein the pixels are YMCK (yellow, magenta, cyan, black) pixels of a 1-bit halftone image for being printed on the document and the indexes are printed on the document by overlapping K pixels, or the pixels are YMC pixels of a 1-bit halftone image for being printed on the document and the indexes are printed on the document as K pixels.

2. The system as claimed in claim 1, wherein the material readable by the optical reader system is a material with a specific reflection wavelength for absorbing light with the specific reflection wavelength.

3. The system as claimed in claim 2, wherein the light is an infrared light.

4. The system as claimed in claim 3, wherein the filter allows a light with wavelength over 800 nm to pass through.

5. The system as claimed in claim 1, wherein the material readable by the optical reader system is a carbonaceous material for absorbing light and thus an index with the carbonaceous material is sensed as a dark dot.

6. The system as claimed in claim 1, wherein the K pixels use a material readable by the optical reader system in printing while the YMC pixels respectively use a material unreadable by the optical reader system in printing.

7. The system as claimed in claim 6, wherein the K pixels overlap indexes, the overlapped indexes are not printed.

8. The system as claimed in claim 1, wherein the YMCK pixels use a material unreadable by the optical reader system in printing.

9. The system as claimed in claim 1, wherein the pixels indicate one or more picture objects respectively contained in an area.

10. The system as claimed in claim 1, wherein the pixels indicate one or more picture objects respectively contained in plural areas.

11. The system as claimed in claim 1, wherein the indexing dots further have plural direction dots distributed on a first distance from the center dot, thereby providing a direction indication.

12. The system as claimed in claim 11, wherein the direction dots have a direction recognition dot as a start of indexing to thereby form a direction of indexing by connecting the direction recognition dot and the center dot as a line.

13. The system as claimed in claim 12, wherein the indexing dots further have plural first data dot distributed on a second distance from the center dot, thereby providing a first data indication, the second distance being greater than the first distance.

14. The system as claimed in claim 13, wherein the indexing dots further have plural second data dot distributed on a third distance from the center dot, thereby providing a second data indication, the third distance being greater than the second distance.

15. The system as claimed in claim 1, wherein the document is formed on an object.

16. The system as claimed in claim 15, wherein the object is a can.

17. The system as claimed in claim 15, wherein the object is a jigsaw.

18. An optical reader system for reading a document with indexes, the document being constructed by printing plural pixels and divided into plural areas, each area having plural indexes to represent an area code corresponding to an area, the indexes and the pixels having different optical reflection features, both the indexes and the plural pixels being printed on the document, each of the indexes having plural indexing dots in an isotropic arrangement, the indexing dots having a center dot for positioning the indexes, the indexes using a material readable by the optical reader system in printing, the system comprising:
  a filter, which allows a light with specific wavelengths to pass through, so as to obtain a desired light corresponding to the indexes of the document;
  a sensor, which is connected to the filter for sensing the light passed through the filter and, accordingly, forming a pattern to output; and
  a decoder, which is connected to the sensor for decoding and thus obtaining corresponding indexes in accordance with the pattern outputted by the sensor,
  wherein the indexing dots further have plural direction dots distributed on a first distance from the center dot, thereby providing a direction indication.

19. The system as claimed in claim 18, wherein the direction dots have a direction recognition dot as a start of indexing to thereby form a direction of indexing by connecting the direction recognition dot and the center dot as a line.

20. The system as claimed in claim 19, wherein the indexing dots further have plural first data dot distributed on a second distance from the center dot, thereby providing a first data indication, the second distance being greater than the first distance.

21. The system as claimed in claim 20, wherein the indexing dots further have plural second data dot distributed on a third distance from the center dot, thereby providing a second data indication, the third distance being greater than the second distance.

22. The system as claimed in claim 18, wherein the document is formed on an object.

23. The system as claimed in claim 22, wherein the object is a can.

24. The system as claimed in claim 22, wherein the object is a jigsaw.

* * * * *